Sept. 4, 1962   W. A. MALMQUIST   3,052,486
HAND PROPELLED VEHICLE
Filed Dec. 23, 1958
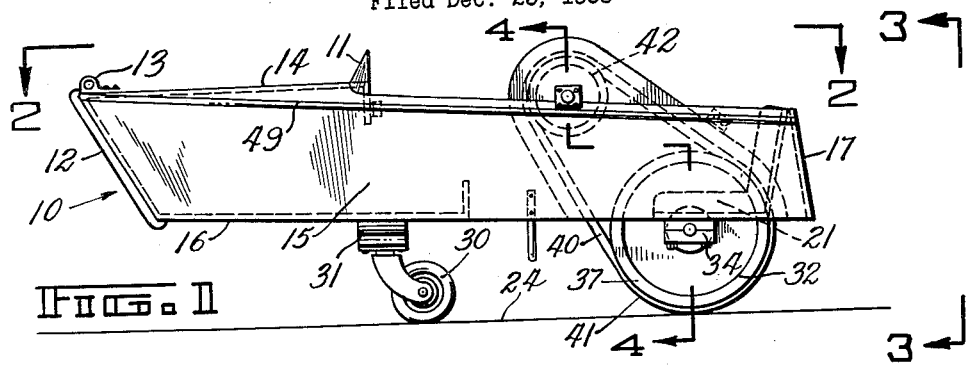
FIG. 1
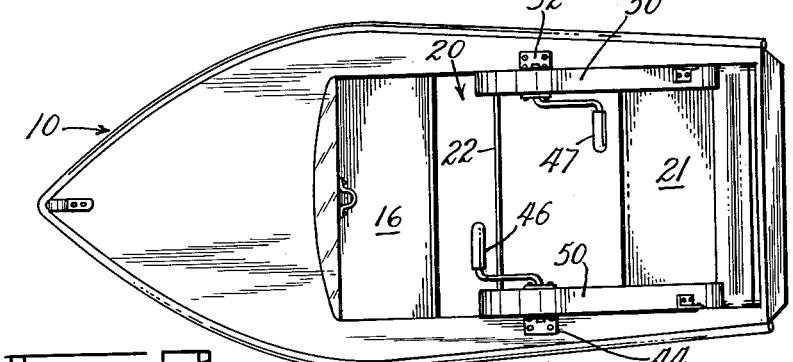
FIG. 2
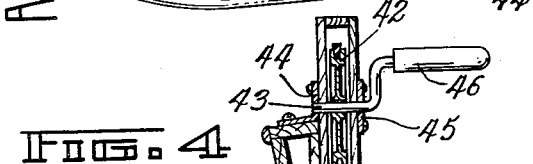
FIG. 4
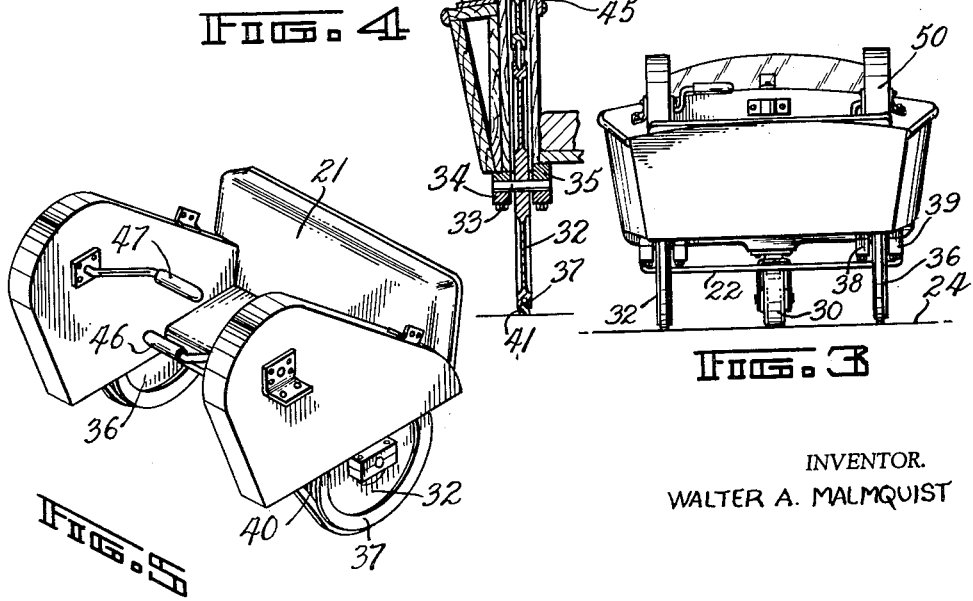
FIG. 3
FIG. 5
INVENTOR.
WALTER A. MALMQUIST 3,052,486
HAND PROPELLED VEHICLE
Walter A. Malmquist, Post Mills, Vt.
Filed Dec. 23, 1958, Ser. No. 782,448
8 Claims. (Cl. 280—211)

This invention relates to a vehicle propelled by an occupant thereof and, in one embodiment, is particularly directed to a toy in the form of a vehicle which is manually propelled by a child sitting therein.

It is an important object of this invention to provide a new and improved wheeled propulsion vehicle embodying a distinctive type of driving or propulsion means suitable for hand operation by an occupant of the vehicle.

It is another object to provide such a vehicle with propulsion means whereby the driving power and driving traction and also the steering of the vehicle are obtained through traveling driving treads that support and cushion most of the weight of the vehicle and occupant.

It is another object to provide a propulsion vehicle in the form of a toy which can easily be propelled and steered by use of the hands of a child seated therein.

Another object is to provide a propulsion vehicle especially suitable for use as a toy, through the operation of which a child or other user will improve his physical coordination and dexterity.

A further object is to provide a vehicle propulsion structure which can be assembled with any of a variety of vehicle bodies and thus utilized as a component of toy vehicles having a variety of attractive designs.

The above mentioned and other objects, features and advantages of this invention will become more apparent from the following detailed description of an illustrative embodiment of the invention. The detailed description refers to the accompanying drawings, which form a part hereof, and in which:

FIG. 1 is a side elevational view of an embodiment of a vehicle according to the invention;

FIG. 2 is a top plan view along line 2—2 of FIG. 1;

FIG. 3 is a rear elevational view along line 3—3 of FIG. 1;

FIG. 4 is a broken sectional view along line 4—4 of FIG. 1, and

FIG. 5 is a perspective view of a propulsion structure according to the invention.

Referring now to the drawings, and in particular to FIGS. 1 to 4 thereof, the propulsion vehicle illustrated therein comprises a vehicle body indicated generally by reference numeral 10, which in the form shown simulates a boat. The body 10 comprises simulated boat parts, including a windshield 11, stem 12, bow eye 13, top deck 14, sides 15 and transom 16. Manifestly, the body of the vehicle may be made in any desired design or form, although for the production of toy vehicles according to this invention, it will generally be given the design of some well-known form of a conveyance.

The body 10 is formed with a cockpit 20, toward the rear of which a seat 21 extends across the body between the sides 15 to support an occupant of the vehicle, such as a child. The cockpit has an open bottom across which a foot stop 22 is rigidly supported by and between the sides 15 to sustain thrust from the feet of a person operating the vehicle. By virtue of the bottom cockpit opening 23 between the foot stop 22 and the seat 21, an occupant of the seat can remove his feet from the foot stop and apply foot pressure against a base surface 24, such as a floor, sidewalk, or ground surface on which the vehicle is moving, to retard or stop, i.e., to brake, the motion of the vehicle.

The vehicle body is supported rollably and in upright position on the base surface by a plurality of wheels. In the embodiment shown there are three wheels seen at 30, 32 and 36. Wheel 30 is a front wheel which is swiveled as a caster in a supporting block 31 on the bottom of the body 10, so that the forward part of the vehicle may swing in any direction on this wheel. Wheels 32 and 36 form a pair of spaced rear wheels which constitute elements of the driving propulsion structure of the vehicle and are mounted at opposite sides of the seat 21, for rotation on a common fixed horizontal axis. An axle 33 for wheel 32 is secured by blocks 34 and 35 to the understructure of body 10, and an axle for wheel 36 is secured similarly by blocks 38 and 39. Of course, the wheels may be mounted in various other ways, and more than one swivelled wheel may be provided if desired.

The propulsion of the vehicle is brought about according to this invention by means of traction elements including at least one but preferably both of the wheels 32 and 36, together with an endless driving belt 40 trained over the rim of each of these wheels and a pulley 42 in driving relation to each endless belt.

Each of the wheels 32 and 36 is formed peripherally with a belt-engaging rim 37 that rolls proximate to the base surface supporting the vehicle. The endless belt 40 is trained over this rim and over the aligned driving pulley 42, so that upon rotation of the driving pulley the belt is driven to turn the body-supporting wheel 32 or 36 and propel the vehicle.

By virtue of this belt propulsion structure, the belt may be made to pass over the rim of the driven wheel with its outer surface in contact with the base surface, thus constituting a travelling driving tread for the vehicle. Moreover, as shown in the drawing, the rim and belt are formed advantageously so that the belt protrudes beyond the rim to provide a travelling tread that holds the rim off the base surface, thus not only cushioning the vehicle but protecting the base surface, such as a finished floor surface, against damage by the rim of the driving wheel.

In the embodiment shown, the driven wheels 32 and 36 have the form of V-belt pulleys; the driving pulleys 42 are also V-belt pulleys but of smaller diameter than the driven wheels; and the endless belts are rubber V-belts of well known construction.

Instead of using a V-belt fitting entirely inside the V-groove of the driven pulley, as in the case of V-belted machines, the V-belt here employed is one oversized for the pulley 32 or 36 so that it protrudes a substantial distance from the outer edge of the rim 37 to support and drive the vehicle on the belt itself, as seen at 41 in FIGS. 1 and 4 of the drawing.

In the illustrated embodiment, the driving pulleys 42 are mounted on an upper part of the body structure in positions disposed forwardly of the seat 21 at opposite sides of the cockpit 20. The belts 40 extend forwardly and upwardly to these pulleys, in upright flights from the base surface and the rims 37 of the driven wheels 32 and 36. And suitable means operable by an occupant of the seat 21 are provided for rotating each driving pulley to drive the associated belt and thus propel the vehicle in either a forward or a backward direction.

For example, each pulley 42 is splined to a crank shaft 43 mounted in suitable bearings 44 and 45 on the body structure, and a hand crank 46 or 47 extends inwardly from each shaft over the cockpit and above and forwardly of the bottom part of the seat 21 in position to be grasped and operated by one hand of the occupant of the vehicle.

With the two cranks 46 and 47 grasped by both hands of the occupant, the two belt drives may be operated independently in any desired way, so as to propel the vehicle easily in any desired direction. By turning one crank and holding the other relatively fixed, the vehicle may be turned on a small radius.

Through selection of the diameters of the driving and driven belt pulleys in a suitable ratio, a power factor is obtained in the belt drives which is appropriate for easy propulsion of the vehicle by a small child.

As a further feature contributing to the ease of propulsion and steering, particularly in embodiments of the invention using distinctly elongated, fairly heavy vehicle bodies, the seat 21 is so located relative to the axis of the wheels 32 and 36 that the weight of the occupant will be centered on a side of that axis away from the swingable end of the body. The weight of the occupant thus counterbalances some of the weight of the forward part of the vehicle body and allows the swivelled wheel supporting that part to swing easily with changing directions of travel.

As seen in the drawings, each assembly of a belt 40 and driving pulley 42 is enclosed within a protective housing 50. The two housings 50, the belt drives within them and the seat 21 form a structural unit, as seen in FIG. 5, which may advantageously be assembled independently in the course of manufacture of finished vehicles. When such structural units are fixed to vehicle bodies of different designs, the vehicles are completely assembled. Independent assembly of the structural units during manufacture provides the economies which result from the production of large numbers of identical units, and permits the units to be stocked to meet unusual production demands for any of a variety of vehicle designs.

In the assembly of a finished vehicle, the structural unit of FIG. 5 is positioned within the cockpit opening 20 of the vehicle body 10, and the axle-supporting blocks on either side of the structural unit are joined to the understructure of the vehicle body. The housings 50 are secured to opposite sides of the top structure of the body by angle irons which also serve as the bearings 44 and 52 for the crank shafts 43. The angle irons join the housings 50 to the side structure of the body 10. The structural unit of FIG. 5 and the body 10 are thus rigidly secured together to form an assembled vehicle.

Furniture and other objects are protected from damage by the vehicle by bumpers 49 formed from strips of hard rubber fixed to projecting areas of the vehicle body. In the illustrated embodiment bumpers 49 overlie the stem 12 and portions of the gunwales of the simulated boat.

While a preferred embodiment of this invention has been described hereinbefore and illustrated in the accompanying drawing, it will be evident that the invention can be embodied in other forms. For example, the vehicle can be rendered amphibious by providing the body 10 with a continuous, liquid-tight bottom. Liquid propulsion members in the form of paddles may be located so that they protrude from the outer surface of each endless belt.

It is desired, therefore, that the invention be limited only by the scope of the appended claims.

I claim:

1. A propulsion vehicle comprising a horizontally elongated vehicle body having a seat near one end thereof to support an occupant, a plurality of wheels continuously supporting said body rollably in upright position on a base surface, two of said wheels being in the form of V-belt pulleys mounted on said body near said one end thereof at opposite sides of said seat, at least one of said wheels being swivelled on an upright axis located toward the other end of said body so that said other end is movable in any direction over said surface by tractions applied through said wheel pulleys, an endless V-belt trained over each of said wheel pulleys, driving V-belt pulleys mounted forwardly and at opposite sides of said seat, one in driving relation to each of said V-belts, and crank means connected with each of said driving pulleys and extending inwardly therefrom to a location over and forward of the bottom part of said seat for operation by the hands of an occupant of said seat to drive said belts independently and thus simultaneously propel and steer the vehicle.

2. A propulsion vehicle comprising a horizontally elongated vehicle body having a seat near one end thereof to support an occupant, a plurality of wheels continuously supporting said body rollably in upright position on a base surface, two of said wheels being in the form of V-belt pulleys mounted on said body near said one end thereof at opposite sides of said seat, at least one of said wheels being swivelled on an upright axis located toward the other end of said body so that said other end is movable in any direction over said surface by tractions applied through said wheel pulleys, an endless V-belt trained over each of said wheel pulleys, driving V-belt pulleys mounted forwardly and at opposite sides of said seat, one in driving relation to each of said V-belts, and crank means connected with each of said driving pulleys and extending inwardly therefrom to a location over or forward of the bottom part of said seat for operation by the hands of an occupant of said seat to drive said belts independently and thus simultaneously propel and steer the vehicle, said V-belts riding in but protruding beyond the V-grooved rims of said wheel pulleys to constitute travelling driving treads for the vehicle that hold said rims off the base surface.

3. A propulsion vehicle comprising a horizontally elongated vehicle body having a seat near one end thereof to support an occupant, a plurality of wheels continuously supporting said body rollably in upright position on a base surface, said wheels including two driven wheels spaced apart at opposite sides of said body near said one end and at least one wheel supporting and swivelled on an upright axis located toward the other end of said body so that said other end will undergo horizontal swinging movement in response to differential rotations of said driven wheels, the periphery of each of said driven wheels forming a belt-engaging rim that rolls proximate to the base surface, two endless belts one of which is trained over each of said rims, said belts drivingly engaging but protruding beyond said rims to hold said driven wheels off the base surface and constitute travelling driving treads for the vehicle, two belt driving pulleys respectively spaced from said rims in driving relation to said belts, and means operable by an occupant of said seat for rotating said pulleys independently to drive said belts independently and thus simultaneously propel and steer the vehicle.

4. A propulsion vehicle comprising a horizontally elongated vehicle body having a seat near one end thereof to support an occupant, a plurality of wheels continuously supporting said body rollably in upright position on a base surface, said wheels including two driven wheels spaced apart at opposite sides of said body near said one end and at least one wheel supporting and swivelled on an upright axis located toward the other end of said body so that said other end will undergo horizontal swinging movement in response to differential rotations of said driven wheels, the periphery of each of said driven wheels forming a belt-engaging rim that rolls proximate to the base surface, two endless belts one of which is trained over each of said rims, said belts drivingly engaging but protruding beyond said rims to hold said driven wheels off the base surface and constitute travelling driving treads for the vehicle, two belt driving pulleys respectively spaced from said rims in driving relation to said belts, and means operable by an occupant of said seat for rotating said pulleys independently to drive said belts independently and thus simultaneously propel and steer the vehicle, said driven wheels being mounted on a fixed horizontal axis and said seat being located between them in a position to center the weight of an occupant on the side of said axis away from said other end of said body.

5. A toy propulsion vehicle comprising a horizontally elongated body shaped to represent a desired conveyance, said body having near its rear end a cockpit and a seat therein to support an occupant, a plurality of wheels mounted on said body to support it rollably in upright position on a base surface, said wheels including driven wheels located to the rear of said body at opposite sides of said seat and at least one wheel swivelled on an upright axis located toward and supporting the forward part of said body so that said forward part is movable in any direction over said surface by tractions applied through said driven wheels, each of said driven wheels having the form of a V-belt pulley, two driving V-belt pulleys disposed forwardly of said seat at opposite sides of said cockpit, two endless V-belts, each trained over one of said wheel pulleys and extending forwardly to and over one of said driving pulleys in driving relation therewith, and a hand crank connected with each of said driving pulleys for rotating the same to drive the associated V-belt and wheel pulley, said cranks being positioned at either side of said cockpit and forwardly of said seat for operation by the hands of an occupant of said seat to propel and steer the vehicle.

6. A toy vehicle as described in claim 5, said V-belts riding in but protruding beyond the V-grooved rims of said wheel pulleys to constitute travelling driving treads for the vehicle that hold said rims off the base surface.

7. A toy vehicle as described in claim 5, said cockpit having a rigid foot stop fixed therein to sustain thrust from the occupant's feet but being open at the bottom between said foot stop and said seat so that the feet of the occupant may work against the base surface to brake the vehicle.

8. In a propulsion vehicle, the combination comprising frame means having two housings spaced apart horizontally and accommodating therebetween a seat bottom for an occupant of the vehicle, vehicle supporting wheels respectively mounted on lower parts of said housings at opposite sides of said seat bottom, the periphery of each of said wheels forming a belt engaging rim, a driving pulley mounted within each of said housings on an upper part thereof above and forwardly of said seat bottom, each of said pulleys being aligned with one of said wheels, an endless driving belt trained over said rim of each of said wheels and over the aligned driving pulley, and crank means connected with each of said pulleys and extending inwardly from it toward the other of said pulleys for operation by an occupant of said seat bottom to drive said belts and thus propel and steer the vehicle.

References Cited in the file of this patent

UNITED STATES PATENTS

| | | |
|---|---|---|
| 24,725 | Davis | July 12, 1859 |
| 1,561,918 | Fedderson | Nov. 17, 1925 |
| 1,705,681 | Proctor | Mar. 19, 1929 |
| 2,436,619 | Swindell | Feb. 24, 1948 |
| 2,469,359 | Ames | May 10, 1949 |
| 2,576,413 | Padjen | Nov. 27, 1951 |
| 2,633,370 | Johnston et al. | Mar. 31, 1953 |
| 2,751,027 | McLaughlin | June 19, 1956 |

FOREIGN PATENTS

| | | |
|---|---|---|
| 629,734 | France | Aug. 2, 1927 |